United States Patent

[11] 3,601,080

[72] Inventor William O. Nygard
Rte. 1 Box 27, Meadowlands, Minn. 55765
[21] Appl. No. 28,628
[22] Filed Apr. 15, 1970
[45] Patented Aug. 24, 1971

[54] TIRE-PRESSURE-WARNING DEVICE
9 Claims, 5 Drawing Figs.

[52] U.S. Cl. .................................................. 116/34,
73/146.2, 73/419, 137/227
[51] Int. Cl. .................................................... B60e 23/06
[50] Field of Search .......................................... 116/34, 65,
70, 55; 73/146.2, 146.3, 146.8, 419; 137/112, 227;
200/61.25

[56] References Cited
UNITED STATES PATENTS
3,129,690 4/1964 Nygard .......................... 116/34
3,235,684 2/1966 Jordan et al. .................. 200/61.25
3,288,101 11/1966 Miller et al. .................. 116/55
3,434,286 3/1969 Raizes .......................... 137/112 X Primary Examiner—Louis J. Capozi
Attorney—Wicks and Nemer ABSTRACT: A cylinder for attachment to an outboard dual wheel, a free member slidably mounted in said cylinder and dividing the cylinder into sealed compartments, a plate sealing off each end of the cylinder, springs urging the free member centrally of the cylinder, air-actuated signal means mounted on the cylinder, the cylinder having an air escape hole centrally thereof and normally covered by said free member and communicating with the signal means when the free member is moved not to cover the air hole, first inlet means communicating with one of said compartments, and second inlet means communicating with the other of said compartments.

Patented Aug. 24, 1971
3,601,080
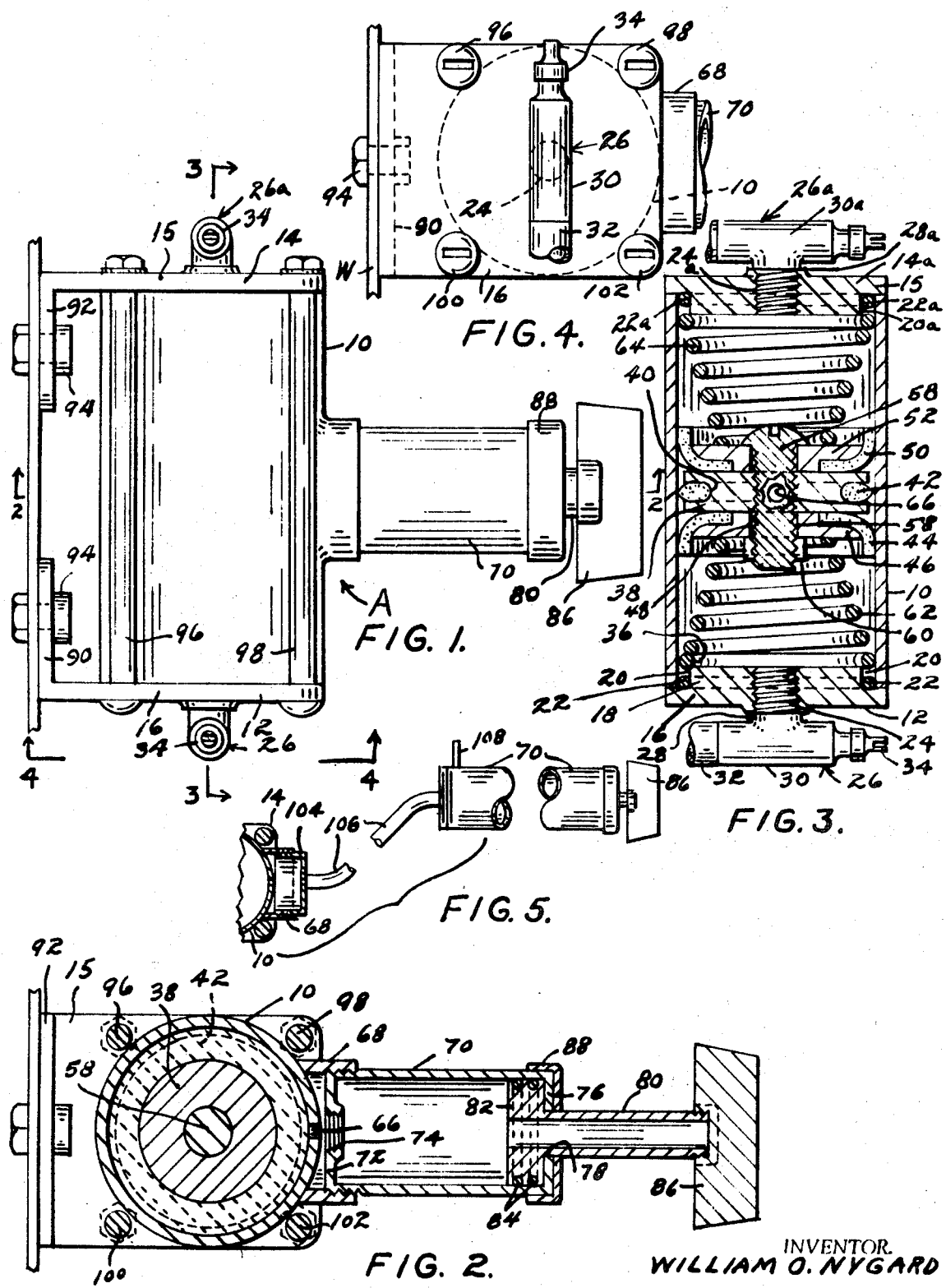
INVENTOR.
WILLIAM O. NYGARD
BY
Hicks & Nemes
ATTORNEYS

TIRE-PRESSURE-WARNING DEVICE

SUMMARY OF THE INVENTION

The invention relates to a tire-pressure-warning device for dual vehicle wheels which gives a visual signal of an imbalance of air pressure in dual wheels to the driver of the vehicle. The operating parts of the device are controlled directly by the pressure in the dual mounted tires and provide an automatically released signal in response to the imbalance of pressure between the dual tires. The device includes a single main cylinder with a signal cylinder extending therefrom together with a connection to each of the dual tires.

In the drawings forming part of this application:

FIG. 1 is a side elevational view of a tire-deflation-warning device embodying the invention with the signal indicator in normal retracted position indicating a proper balance of tire pressure.

FIG. 2 is a sectional view on the line 2—2 of FIG. 1 but with the signal indicator in extended signal position.

FIG. 3 is a sectional view on the line 3—3 of FIG. 1.

FIG. 4 is an end view of the device on the line 4—4 of FIG. 1.

FIG. 5 is a side elevational partial sectional view of an alternative form of a remote indicator, portions thereof being broken away, other portions being in section.

Referring to the drawings in detail, the warning device A for indicating an imbalance of air pressure in dual tires includes the cylinder 10, and secured to the ends of the cylinder are the end members 12 and 14. The end member 12 includes the flat plate 16 formed with the circular raised portion 18 with the diameter of the portion 18 less than the inside diameter of the cylinder 10 thereby providing an annular groove 20 between the portion 18 and the cylinder 10 in which the O-ring 22 is positioned. The O-ring 22 makes sealing contact with the cylinder 10 and the end member. The end member 14 is identical to the member 12 and includes the flat plate 15 and the corresponding parts bear the same reference numeral but accompanied by a lower case letter $a$. The end member 12 is formed with the concentric threaded hole 24 which mounts inlet member 26 formed of the hollow threaded base portion 28 connected to the hollow T-portion 30. One end of the inlet member 26 mounts the hose 32 and the other end mounts the cap 34 and a conventional internal air valve not shown. An identical inlet member 26a is mounted on the end member 14. An O-ring 22a is positioned in the groove 20a which makes sealing contact with the cylinder 10 and the end member 14.

The end member 12 is also formed with the annular shoulder 36. The numeral 38 designates a floating slidable central disc member the diameter of which is less than the inside diameter of the cylinder 10 and formed in the edge of disc 38 is an annular groove 40 in which is mounted the ring gasket 42 which makes sealing contact with the inner surface of the cylinder 10. Mounted on one side of the disc 38 is a first sealing circular cup 44 secured in place by the first circular plate 46 formed with the axial hole 48. Mounted on the other side of the disc 38 is a second sealing circular cup 50 secured in place by the second circular plate 52 formed with the axial hole 54. The disc 38 is formed with the threaded axial hole 56 which receives the threaded bolt 58. The bolt 58 extends the holes of the plates 46 and 52, the hole of the disc 38 and through the sealing cups 44 and 50. A nut 60 is tightened upon the bolt 58 thereby causing the plates 46 and 52 to bear upon the sealing cups 44 and 50 which in turn bear against the disc 38. The outer edges of the sealing cups 44 and 50 make sliding and sealing engagement with the inner surface of the cylinder 10.

The numeral 62 designates a first coil spring one end of which is positioned upon the annular shoulder 36 of the end member 12 whereby the spring is positioned axially of the cylinder with the other end of the spring in pressure contact with the plate 46. Further provided is a second coil spring 64 one end of which is positioned upon the annular shoulder 20a of the end member 14a whereby the spring is positioned axially of the cylinder with the other end of the spring in pressure contact with the plate 52. With the springs 62 and 64 being identical in length and exerting equal pressure upon the central disc 38 the disc is normally urged to a position centrally of the cylinder 10, particularly FIG. 3.

The numeral 66 designates an air escape hole formed in the wall of the cylinder 10 centrally of the length of the cylinder. Secured to the outer surface of the cylinder 10 and in alignment with the air escape hole 66 is the cylindrical mount 68 which is threaded internally at the outer end to receive the inner threaded end of the indicator cylinder 70. The cylinder 70 has formed on the inner end thereof the inner end wall 72 having the axial threaded hole 74. The cylinder 70 has formed on the outer end thereof the outer end wall 76 formed with the axial hole 78. Slidably positioned within the hole 78 is the shaft 80 which has mounted on the inner end thereof the piston 82 which mounts the pair of O-rings 84 for sealing sliding engagement with the inner surface of the indicator cylinder 70. Mounted on the outer end of the shaft 80 is the flag member 86. A rubber sealing cap 88 is mounted on the end of the cylinder 70 which has sealing contact with the shaft 80.

The plates 15 and 16 extend beyond the cylinder 10 and are formed with the right angular flanges 90 and 92, respectively, which allow securing of the device to the wheel W of a vehicle by means of the bolts 94. The end plates 15 and 16 are held securely upon the ends of the cylinder 10 by means of the elongated nut-equipped bolts 96, 98, 100, and 102 extended through holes formed in the plates.

The hose 32 is connected to the tire stem of one of a pair of dual vehicle wheels, and the hose 32a is connected to the tire stem of the other of the pair of dual vehicle wheels not shown. The tires of the dual combination are each filled through an inlet member 26 and 26a, respectively. With the air pressure from each tire registering on the respective side of the central disc 38 the disc remains in the centralized position of FIG. 3. In the event of a loss of air pressure in one tire an imbalance in air pressure is created in the cylinder 10 on one side of disc 38 with a longitudinal displacement of the disc 38. As the disc 38 moves, and the air escape hole 66 is uncovered, and air pressure enters the indicator cylinder 70 through hole 66 causing the piston 82 to be forced outwardly thereby ejecting the flag 86 to warn of a loss in tire pressure. Once the loss in tire pressure is corrected the disc 38 will resume its central position in the cylinder 10, and the air escape hole is again covered. The ejection of the flag 86 is noted by the driver of the vehicle for the flag extends well beyond the confines of the wheel and tire that the device A is mounted on.

In FIG. 5 is disclosed a construction allowing a remote positioning of the indicator cylinder 70 and flag 86 thereon. This is accomplished by placing the cap 104 upon the mount 68 and secured to and leading from the cap is the hose 106 the end of which is threadedly engaged in the threaded hole 74 of the end wall 72 of the cylinder 70. The cylinder 70 has formed thereon the bracket 108 used to mount the cylinder 70 on a wheel rim, for example, remote from the cylinder 70.

I claim:

1. A device for signaling imbalance of air pressure in dual-mounted pneumatic vehicle tires comprising
   a. a cylinder for attachment to an outboard dual wheel,
   b. a free member slidably mounted in said cylinder and dividing said cylinder into two sealed compartments,
   c. means sealing off each end of said cylinder,
   d. means urging said free member normally centrally of the cylinder,
   e. air-actuated signal means mounted on said cylinder,
   f. said cylinder having an air escape hole centrally thereof and normally covered by said free member and communicating with said signal means when the free member is moved to not cover the air hole whereby the signal means is responsive to air pressure in the cylinder,
   g. first inlet means communicating with one of said compartments and adapted for connection with one of a pair of dual tires, h. second inlet means communicating with the other of said compartments and adapted for connection with the other of a pair of dual tires, a reduction of air pressure in one compartment due to a loss of pressure in a tire connected thereto causing said free member to move toward the reduced pressure area and expose said air escape hole of said cylinder and allow the greater air pressure of the other compartment to actuate the signal means.

2. The device of claim 1 in which
a. said free member is a disk having
b. sealing means on the periphery thereof for engagement with the inner surface of the cylinder.

3. The device of claim 2 in which said means for sealing off each end of the cylinder is a plate.

4. The device of claim 3 in which said urging means includes
a. a spring positioned between said free member and each end of the cylinder.

5. The device of claim 4 in which said signal means includes
a. a second cylinder connected to said cylinder and communicating with said air escape hole,
b. a piston in said second cylinder having
c. a shaft connected thereto and extending from said second cylinder
d. said shaft having a signal member on the outer end thereof.

6. The device of claim 5 in which said first communicating inlet means includes
a. a hose and
b. an air valve carried thereby, and
c. said second communicating inlet means includes a hose and
d. an air valve carried thereby.

7. The device of claim 1 in which said urging means includes
a. a spring positioned between said free member and each end of the cylinder.

8. The device of claim 1 in which said signal means includes
a. a second cylinder connected to said cylinder and communicating with said air escape hole,
b. a piston in said second cylinder having
c. a shaft connected thereto and extending from said cylinder,
d. said shaft having a signal member on the outer end thereof.

9. The device of claim 1 in which said air-actuated signal means includes
a. a second cylinder,
b. a piston in said second cylinder having
c. a shaft connected thereto and extending from said second cylinder,
d. said shaft having a signal member on the outer end thereof,
e. said second cylinder having a hose connected thereto and said air escape hole of said cylinder.